United States Patent
Nakajima (10) Patent No.: US 8,324,844 B2
(45) Date of Patent: Dec. 4, 2012

(54) ULTRASONIC MOTOR DEVICE

(75) Inventor: Noriaki Nakajima, Yokohama (JP)

(73) Assignee: Nikon Corporation, Tokyo (JP)

( * ) Notice: Subject to any disclaimer, the term of this patent is extended or adjusted under 35 U.S.C. 154(b) by 159 days.

(21) Appl. No.: 12/929,012

(22) Filed: Dec. 22, 2010

(65) Prior Publication Data

US 2011/0095712 A1   Apr. 28, 2011

Related U.S. Application Data (63) Continuation of application No. 11/441,243, filed on May 26, 2006, now abandoned.

(30) Foreign Application Priority Data

May 30, 2005 (JP) ................................. 2005-157162

(51) Int. Cl.
*H01L 41/04* (2006.01)

(52) U.S. Cl. ..................... 318/116; 318/649; 318/135

(58) Field of Classification Search .................. 318/116, 318/649, 135, 638, 648
See application file for complete search history.

(56) References Cited

U.S. PATENT DOCUMENTS

| | | | |
|---|---|---|---|
| 3,806,780 A | 4/1974 | Jones | |
| 4,331,910 A | 5/1982 | Kohzai et al. | |
| 5,008,605 A | 4/1991 | Ohara et al. | |
| 5,287,137 A | 2/1994 | Hara et al. | |
| 5,493,163 A | 2/1996 | Nishikawa | |
| 5,646,495 A | 7/1997 | Toyozawa et al. | |
| 5,678,070 A | 10/1997 | Kai | |
| 5,710,491 A | 1/1998 | Takagi et al. | |
| 5,844,394 A | 12/1998 | Mushika et al. | |
| 5,990,596 A | 11/1999 | Kitai et al. | |
| 6,084,335 A | 7/2000 | Tamai | |
| 6,144,184 A | 11/2000 | Yamaguchi | |
| 6,690,101 B2 | 2/2004 | Magnussen et al. | |
| 6,838,855 B2 | 1/2005 | Kobayashi et al. | |
| 6,965,188 B2 | 11/2005 | Kasai | |
| 7,932,660 B2 * | 4/2011 | Hamamoto et al. | 310/323.09 |
| 2004/0150357 A1 | 8/2004 | Endo | |

FOREIGN PATENT DOCUMENTS

JP   A 2003-304691   10/2003

* cited by examiner

*Primary Examiner* — Karen Masih (74) *Attorney, Agent, or Firm* — Oliff & Berridge, PLC (57) ABSTRACT

An ultrasonic motor device includes: an ultrasonic motor that moves an object; a detecting unit that detects movement of the object; and a control unit that drives the ultrasonic motor according to a first driving signal before detection of the movement of the object, and drives the ultrasonic motor according to a second driving signal, which is different from the first driving signal, after detection of the movement of the object.

16 Claims, 6 Drawing Sheets

ULTRASONIC MOTOR DEVICE

INCORPORATION BY REFERENCE

This is a Continuation of application Ser. No. 11/441,243 filed May 26, 2006. The disclosure of the prior application is hereby incorporated by reference herein in its entirety.

The disclosures of the following priority application are herein incorporated by reference: Japanese Patent Application No. 2005-157162, filed May 30, 2005

BACKGROUND

1. Field of the Invention

The present invention relates to an ultrasonic motor device for controlling driving of an ultrasonic motor.

2. Description of the Related Art

There is known a control device for controlling driving of an ultrasonic motor while feeding back output from a speed detector such as an encoder. (see Japanese Laid-open Patent Publication No. 2003-304691)

SUMMARY

However, in the event of driving the ultrasonic motor with backlash between gears, movement of the ultrasonic motor is not detected until the backlash has been taken up, even though the ultrasonic motor is actually moving. Accordingly, the feedback control results in acceleration, and moving too fast in turn bumps away the article to be controlled at the point that the backlash runs out, and then backlash is generated again. Such effects of backlash being repeated have been problematic in proper control.

According to the 1st aspect of the invention, an ultrasonic motor device comprises: an ultrasonic motor that moves an object; a detecting unit that detects movement of the object; and a control unit that drives the ultrasonic motor according to a first driving signal before detection of the movement of the object, and drives the ultrasonic motor according to a second driving signal, which is different from the first driving signal, after detection of the movement of the object.

According to the 2nd aspect of the invention, in the ultrasonic motor device according to the 1st aspect, it is preferred that: there is further provided a transmission unit that transmits driving force of the ultrasonic motor to the object; and the control unit controls transmission error in the transmission unit by driving the ultrasonic motor according to the first driving signal.

According to the 3rd aspect of the invention, in the ultrasonic motor device according to the 2nd aspect, it is preferred that the transmission unit includes a gear train.

According to the 4th aspect of the invention, in the ultrasonic motor device according to any one of the 1st through 3rd aspects, it is preferred that the control unit sets the first driving signal and the second driving signal such that a driving speed of the ultrasonic motor driven according to the second driving signal is faster than a driving speed of the ultrasonic motor driven according to the first driving signal.

According to the 5th aspect of the invention, in the ultrasonic motor device according to any one of the 1st through 4th aspects, it is preferred that the control unit detects a movement speed of the object which is the same as a movement speed of the object driven according to the first driving signal, during at least one of a time of acceleration and a time of deceleration when the ultrasonic motor is driven according to the second driving signal.

According to the 6th aspect of the invention, in the ultrasonic motor device according to any one of the 1st through 5th aspects, it is preferred that the control unit drives the ultrasonic motor according to the second driving signal, following driving the ultrasonic motor according to the first driving signal for a predetermined amount of time.

According to the 7th aspect of the invention, in the ultrasonic motor device according to any one of the 1st through 6th aspects, it is preferred that the detecting unit comprises an encoder.

According to the 8th aspect of the invention, in the ultrasonic motor device according to any one of the 1st through 7th aspects, it is preferred that the first driving signal is a signal used for driving the ultrasonic motor under open loop control, and the second driving signal is a signal used for driving the ultrasonic motor under feedback control.

According to the 9th aspect of the invention, in the ultrasonic motor device according to the 8th aspect, it is preferred that the control unit performs feedback control according to the second driving signal, based on information from the detecting unit.

According to the 10th aspect of the invention, a lens barrel comprises: a main lens barrel having an optical component; and an ultrasonic motor device according to any one of the 1st through 9th aspects.

According to the 11th aspect of the invention, a camera is capable of mounting a lens barrel according to the 10th aspect.

According to the 12th aspect of the invention, a control method for controlling an ultrasonic motor device comprises: driving of an ultrasonic motor according to a first driving signal; detecting of movement of an object moved by the ultrasonic motor; and driving of the ultrasonic motor according to a second driving signal which differs from the first driving signal, following detection of the movement of the object.

According to the 13th. A control method according to the 12, wherein, in an event that the ultrasonic motor is driven according to the first driving signal for a predetermined amount of time before detection of the movement of the object, control mode is switched to a mode in which the ultrasonic motor is driven according to the second driving signal.

According to the 14th aspect of the invention, in the control method according to the 12th or the 13th aspect, it is preferred that a movement speed of the object which is the same as a movement speed of the object driven according to the first driving signal is detected during at least one of a time of acceleration and a time of deceleration when the ultrasonic motor is driven according to the second driving signal.

According to the 15th aspect of the invention, in the control method according to any one of the 12th through 14th aspects, it is preferred that the first driving signal is a signal used for driving the ultrasonic motor under open loop control, and the second driving signal is a signal used for driving the ultrasonic motor under feedback control.

DETAILED DESCRIPTION OF EMBODIMENTS

Figure 1:
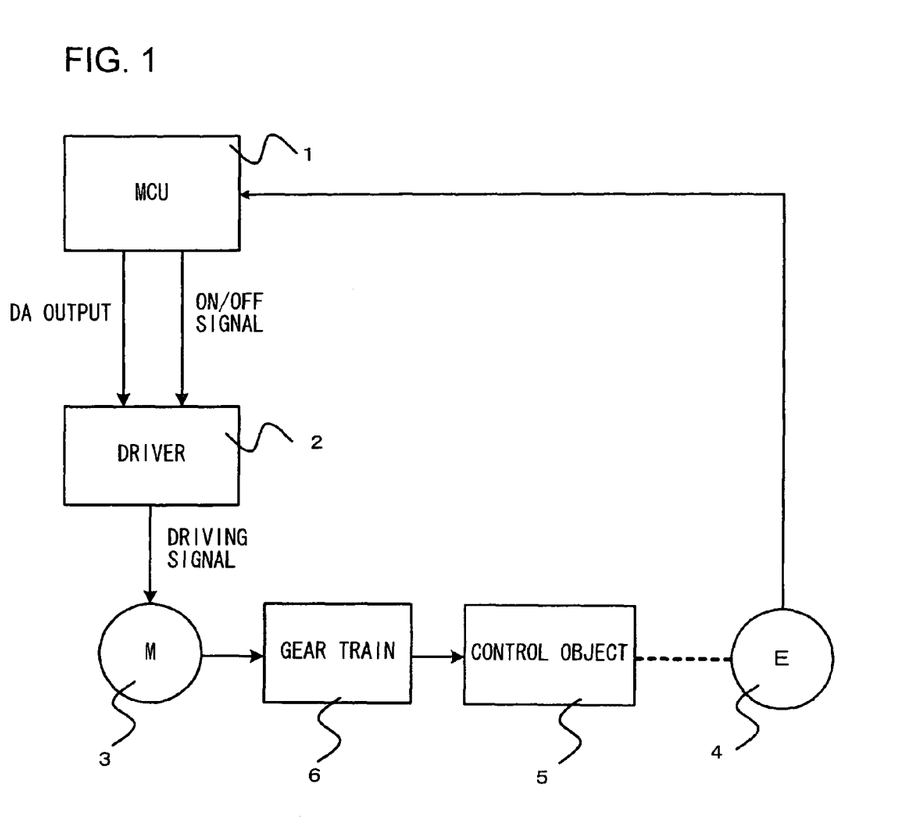
FIG. 1 is a configuration diagram of an ultrasonic motor device, which is an embodiment of the present invention.
Figure 2:
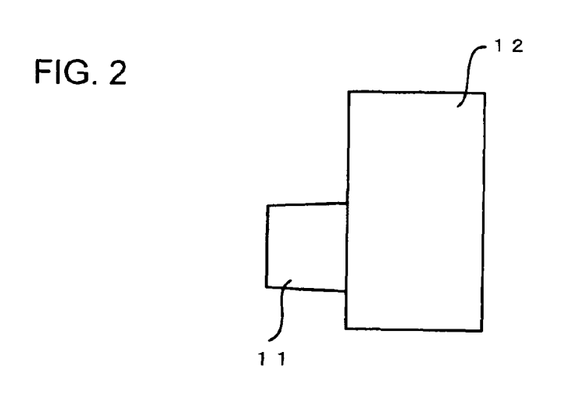
FIG. 2 is a diagram illustrating a lens barrel 11 and a camera body 12 in which the ultrasonic motor device is used.

FIG. 1 is a configuration diagram of an ultrasonic motor device (control device) which is an embodiment of the present invention, and FIG. 2 is a diagram illustrating a lens barrel 11 and a camera body 12 with which the ultrasonic motor device is used. The ultrasonic motor device according to the present embodiment is mounted within a lens barrel 11, and is used for driving lenses (optical components) for automatic focus control and so forth. The power supply for the ultrasonic motor device is supplied from the camera body 12.

In FIG. 1, an MCU 1 is provided, which is configured from a microcomputer and peripheral circuits thereof, for executing predetermined programs and performing driving control of the ultrasonic motor 3 based on external instructions. The MCU 1 also receives signals from an encoder 4, and outputs DA (digital-to-analog) output corresponding to the driving frequency, and On/Off signals for permitting/forbidding driving operations, according to the external instructions and the signals from the encoder 4.

A driver 2 receives the On/Off signals and the DA output from the MCU 1, and outputs driving signals to the ultrasonic motor 3. An unshown VCO (Voltage Control Oscillator) emits signals of a frequency corresponding to the DA output, which is voltage signals.

The ultrasonic motor 3 rotates at the rotation speed corresponding to the driving frequency of the input driving signals, and transmits driving force to a control object 5 via a gear train (transmission mechanism) 6. Note that with the present embodiment, the relation between driving frequency and the rotation speed of the ultrasonic motor 3 exhibit generally inversely proportionate properties, so that increasing the driving frequency lowers the rotation speed of the ultrasonic motor 3. The encoder 4 is attached nearby the control object 5, so as to detect movement of the control object 5.

Mechanical backlash exists in the gear train 6. The backlash means a space or a play between gears to cause looseness of the gear train 6. With the backlash between the gears, movement of the ultrasonic motor 3 cannot be detected through the encoder 4 until the backlash is taken up, even though the ultrasonic motor 3 is actually moving. Accordingly, DA output due to simple feed back of the signals from the encoder 4 will result in acceleration in the rotation speed, and moving too fast in turn bumps away the article to be controlled at the point that the backlash runs out, and then backlash is generated again. Such effects of backlash being repeated create problems in performing proper control, i.e., transmission error in the gear train 6.

Figure 7A:
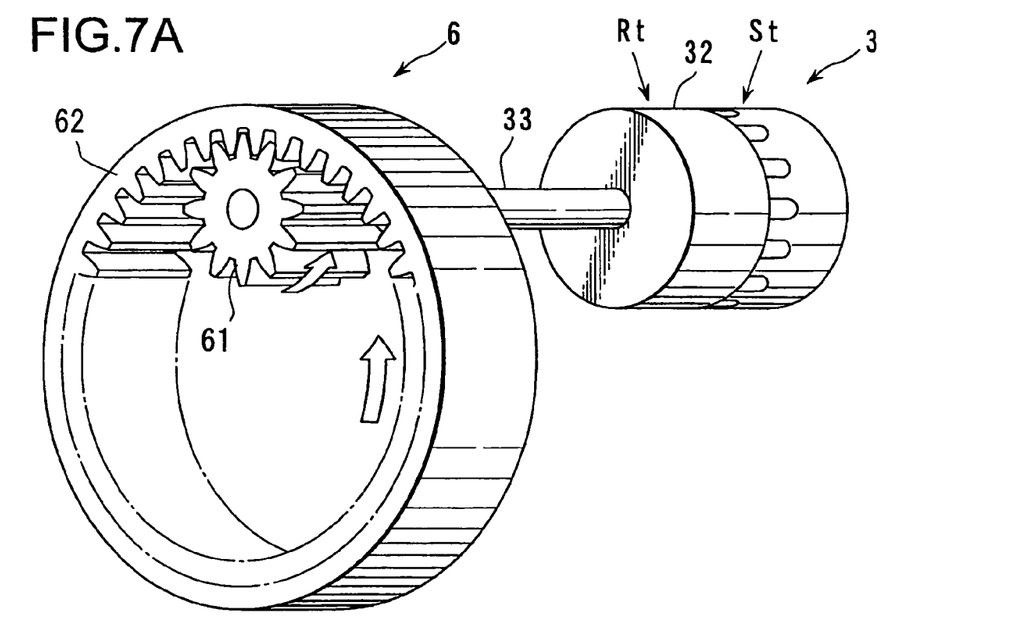
FIG. 7A is a diagram illustrating the ultrasonic motor 3 and a gear train 6.

FIG. 7A is a diagram illustrating the ultrasonic motor 3 and the gear train 6. The ultrasonic motor 3 is configured of a stator 31, rotor 32, and a rotor shaft 33, with the rotor 32 and the rotor shaft 33 rotating. A pinion gear 61 is attached to the rotor shaft 33. Rotational force of the ultrasonic motor 3 is transmitted to a segment gear 62 via the pinion gear 61, with the pinion gear 61 and segment gear 62 making up the gear train 6.

The segment gear 62 is formed cylindrically, and engaged with a lens holding frame. Furthermore, the segment gear 62 also serves as the control object 5 shown in FIG. 1. An encoder 4 (not shown in FIG. 7A) is disposed near the segment gear 62, for detecting rotation of the segment gear 62. In the event of rotating the segment gear 62 in the counter-clockwise direction, the ultrasonic motor 3 is driven such that the rotor 32 is driven in the counter-clockwise direction, and in the event of rotating the segment gear 62 in the clockwise direction, the ultrasonic motor 3 is driven such that the rotor 32 is driven in the clockwise direction.

Figure 7B:
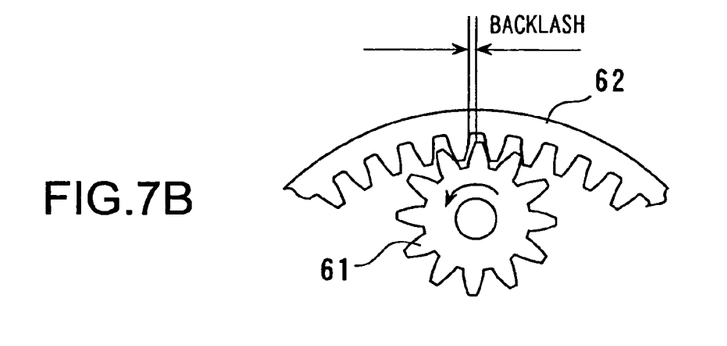
FIG. 7B is a diagram depicting a state wherein there is backlash in the gear train 6.
Figure 7C:
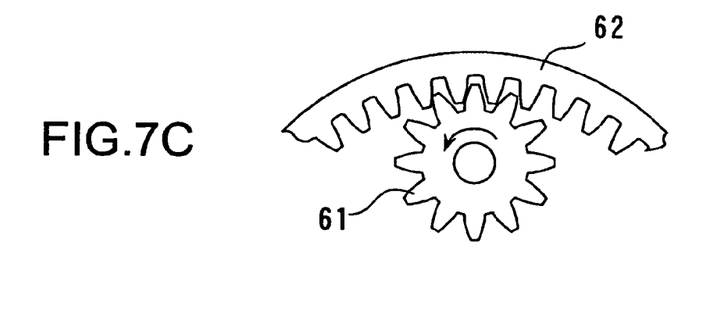
FIG. 7C is a diagram depicting a state wherein the backlash in the gear train 6 has been taken up.

FIG. 7B is a diagram depicting a state wherein there is backlash in the gear train 6 at the time of the pinion gear 61 rotating in the direction indicated by the arrow. Another way of describing backlash would be to say space between the engaging portions (teeth) of the pinion gear 61 and the segment gear 62. FIG. 7C is a diagram depicting a state wherein the backlash in the gear train 6 has been taken up or removed due to the pinion gear 61 having rotated in the direction indicated by the arrow. In the state wherein the backlash has disappeared, there is no space at the engaged portion between the pinion gear 61 and the segment gear 62, with the teeth of the pinion gear 61 and the segment gear 62 being in contact.

Accordingly, to avoid the effects of such backlash, with the present embodiment, driving signals are output by open loop control at a speed level such that the control object 5 will not be bumped away at the time of starting driving the ultrasonic motor 3 (i.e., the backlash removal speed), and upon detection that the backlash has been taken up, the mode is switched to feed back control which is normal control, so that driving signals generated based on feedback control are output. "Open loop control" means control which is not feed back control, or more simply control without feedback, and can also be referred to as "feed-forward control".

Also, the ultrasonic motor 3 is capable of changing the rotation speed by changing the driving frequency, but the correlation between the frequency and the rotation speed is not stable, due to various factors such as ambient temperature, load torque, rotational irregularities, and so forth. Accordingly, even if open loop control is being performed at a speed level such that the control object 5 is not bumped away, environmental changes may result in higher-than-expected speeds bumping the control object away, or conversely insufficient speeds leading to longer driving time, and in worst-scenario cases movement may stop completely.

Accordingly, with the present embodiment, the driving frequency (DA output) for backlash removal is always updated with the driving frequency (DA output) corresponding to the driving speed for backlash removal that has been obtained by the immediately-preceding driving. The next driving for backlash removal is performed using the driving frequency thus updated.

Figure 3:
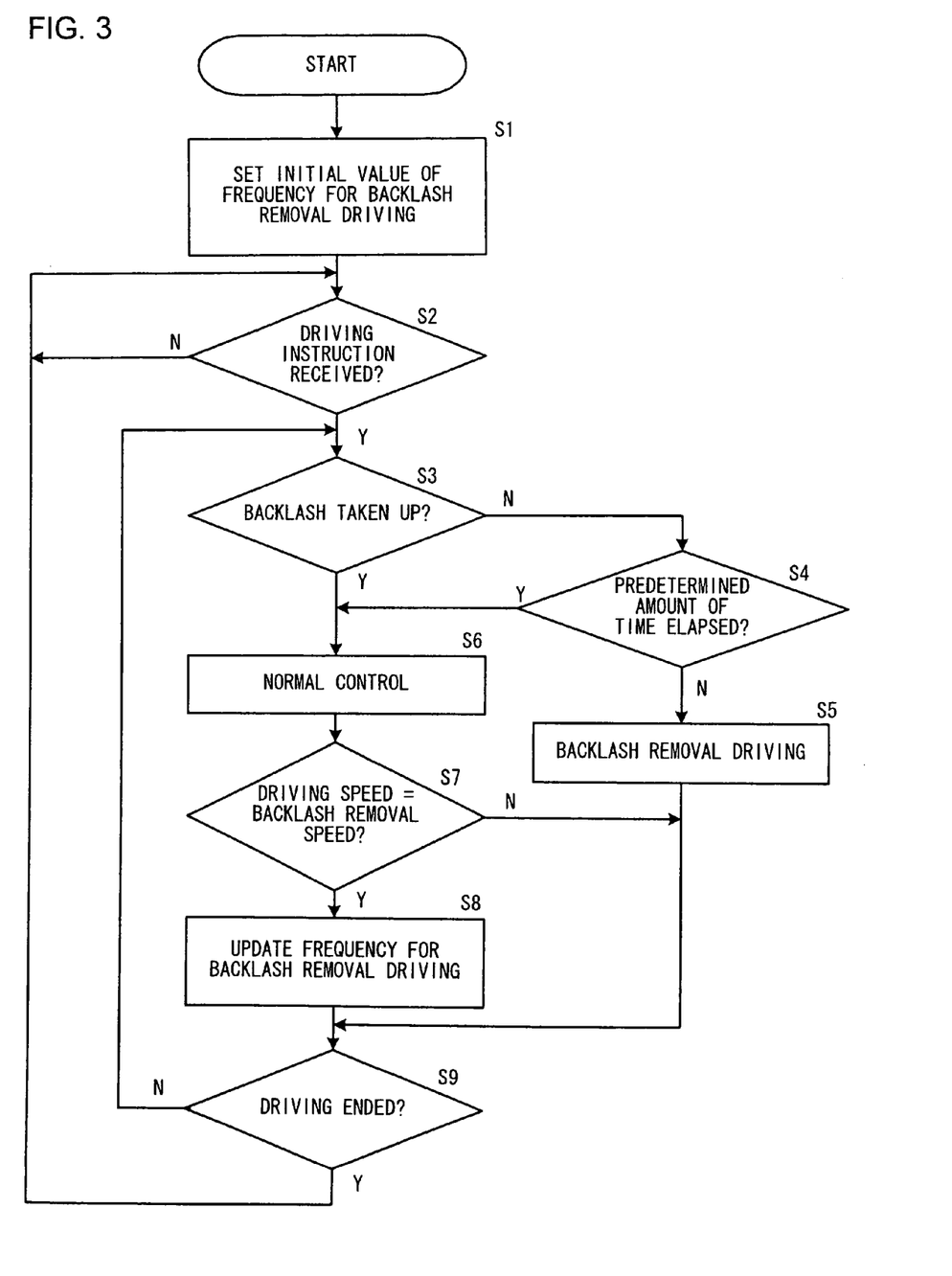
FIG. 3 is a diagram illustrating a flowchart of processing performed by an MCU 1.

FIG. 3 is a flowchart illustrating processing with the MCU 1. This processing starts by turning the power of the camera body 12 on. In step S1, the backlash removal driving frequency (DA output) is set to an initial value in the initialization immediately following turning the power on. In step S2, determination is made regarding whether or not there has been a driving instruction. In the event that there has been a driving instruction the flow proceeds to step S3. On the other hand, in the event that there has been no driving instruction, the processing in step S2 is repeated.

In step S3, determination is made regarding whether or not backlash has been taken up or removed. This is determined by determining whether or not the control object 5 has begun to move, based on signals from the encoder 4. In the event that the backlash has not been taken up yet, the flow proceeds to step S4. Otherwise, the flow proceeds to step S6. In the event that backlash has been taken up, control is effected such that another backlash removal is not performed in driving for one time.

In step S4, determination is made regarding whether or not a predetermined amount of time has elapsed. This is to provide a time limit for backlash removal. With such an arrangement, in the event that the backlash removal is not completed due to some sort of abnormality, transition is made to normal control. In step S5, backlash removal is performed, wherein driving signals of the set backlash removal driving frequency (DA output value) are output until the backlash is taken up.

In step S6, feedback control is performed as the normal control processing. The MCU 1 obtains the speed of the control object 5 based on signals from the encoder 4, and performs feedback control of the ultrasonic motor 3 so as to match the target speed. The speed and the driving frequency (DA output value) at this time are stored in unshown memory, for use in the later-described step S8. The memory further has capacity for storing data for the duration of the later-described response delay time.

In step S7, determination is made regarding whether or not the speed of the control object 5 detected by the encoder 4 is equal to the backlash removal driving speed. This backlash removal driving speed is the driving speed at which the control object 5 is driven in a backlash-removed state in the event of driving the ultrasonic motor 3 at a backlash removal frequency (backlash removal signals). This can also be referred to as "backlash removal signal speed". The speed of the control object 5 is determined by computation performed by the MCU 1, based on the signals from the encoder 4. In the event that the speed of the control object 5 is equal to the backlash removal driving speed, the flow proceeds to step S8. Otherwise, the flow proceeds to step S9.

In step S8, giving consideration to response delay, the driving frequency (DA output value) output in the past for the duration of the response delay time is written to the unshown memory as the new driving frequency (DA output value). The driving frequency (DA output value) output in the past for the duration of the response delay time is obtained from memory where it has been stored in step S6. In step S9, in the event that conditions for ending driving are complete according to another unshown routine, the driving ends and the flow returns to step S2. Accordingly, driving for one time ends. An example would be a case wherein auto-focusing of the lens barrel 11 is completed. Otherwise, the flow returns to step s3 for each control cycle.

Figure 4A:
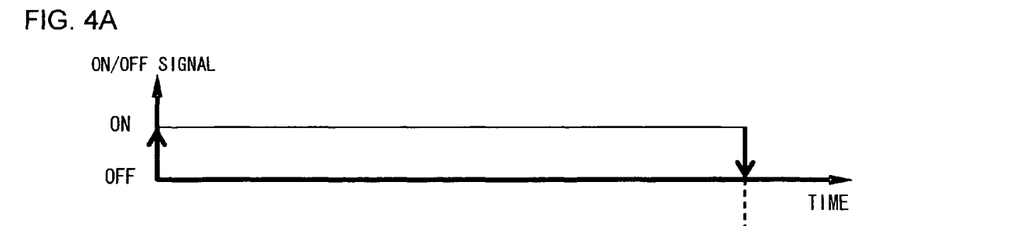
FIGS. 4A through 4D are graphs illustrating the driving of an ultrasonic motor 3 for one time.
Figure 4B:
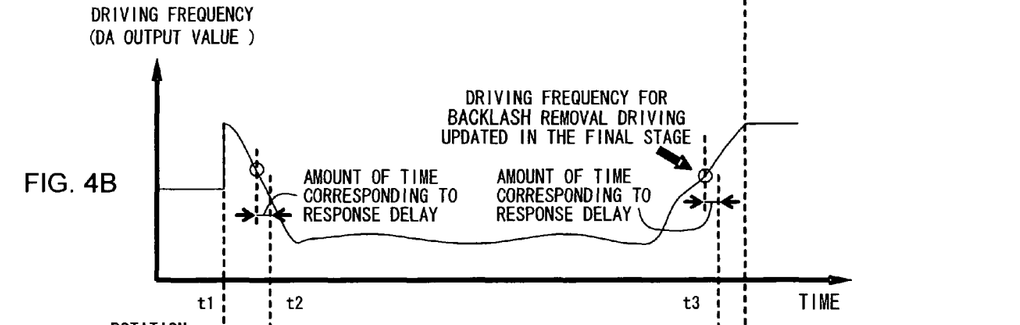
Figure 4C:
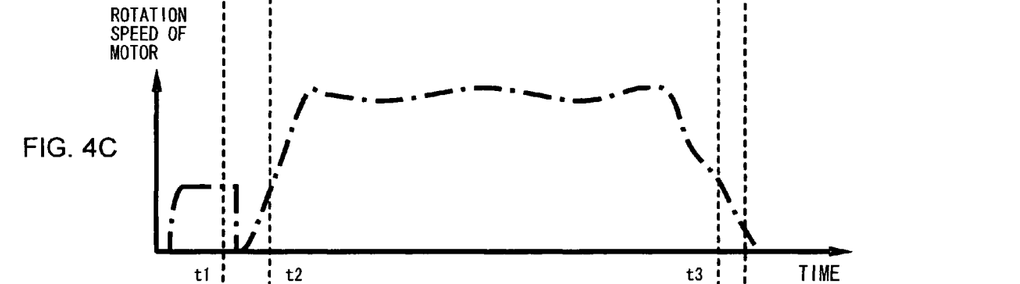
Figure 4D:
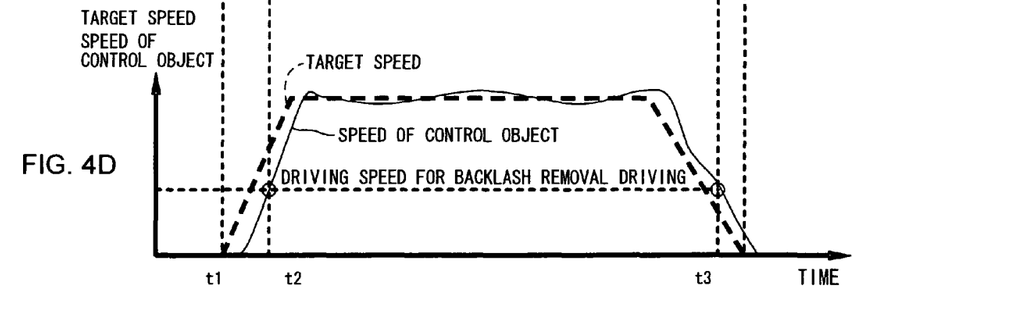
Figure 5A:
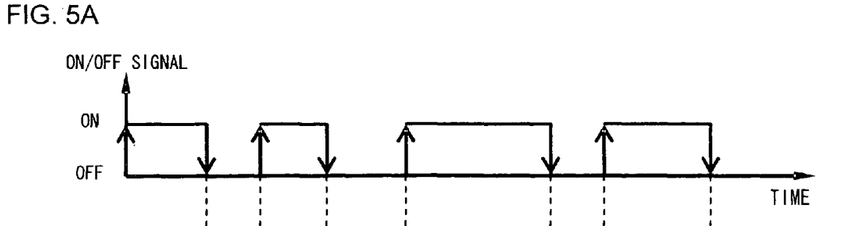
FIGS. 5A through 5D are graphs illustrating the driving of the ultrasonic motor 3 multiple times.
Figure 5B:
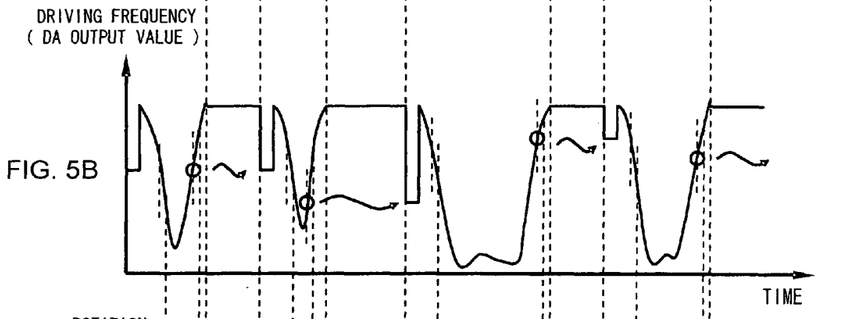
Figure 5C:
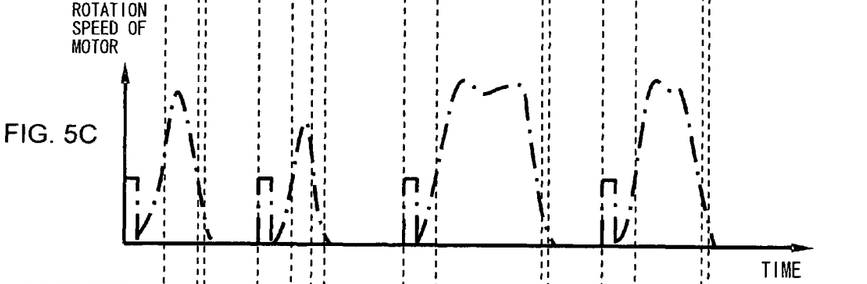
Figure 5D:
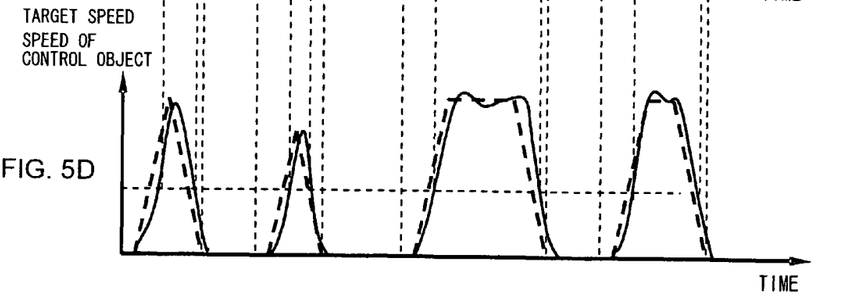

FIGS. 4A through 4D are diagrams illustrating the driving of the ultrasonic motor 3 for one time following turning the power of the camera body 12 on. This illustrates one time of driving, which is equivalent to step S1 through step S9 in the flowchart shown in FIG. 3. FIG. 4A illustrates the On/Off signal which the MCU 1 outputs. FIG. 4B illustrates the driving frequency (DA output value) of the ultrasonic motor 3 which the MCU 1 outputs. FIG. 4C illustrates the movement, i.e., the number of rotations (rotational speed) of the ultrasonic motor 3. FIG. 4D illustrates the driving speed of the control object 5, wherein the dotted liens show the target speed of the control object 5 while the solid lines show the actual driving speed (moving speed) of the control object 5 that is detected by the encoder 4.

The MCU 1 sets the On/Off signal to on. Furthermore, the MCU 1 outputs a predetermined value of the driving frequency (DA output), which is used for backlash removal driving (see FIGS. 4A and 4B). This action corresponds to proceeding from step S2 to step S3 in FIG. 3. The ultrasonic motor 3 starts moving following a delay time corresponding to the response delay (see FIG. 4C). Subsequently, control mode is switched to feedback control at the timing t1 at which there is output from the encoder 4 (see FIG. 4B). This action corresponds to proceeding from step S3 to step S6 in FIG. 3.

Subsequently, the ultrasonic motor 3 accelerates at a constant rate under feedback control. Then, following attaining top speed, the speed is maintained. In the final stage, the speed is reduced at a constant rate. Now, at the acceleration and deceleration portions of this action, there are t2 and t3 (see FIG. 4D) at which the speed of the movement of the control object 5 matches the backlash removal driving speed. As can be further seen from the drawings, the driving speed under feedback control, i.e., the top speed, is set so as to be faster than the backlash removal driving speed.

At t2 and t3, the conditions in step S7 in FIG. 3 are satisfied, so in step S8 the backlash removal driving frequency is updated. Specifically, the frequencies (DA outputs) updated at these points in time, i.e., the values indicated by the circles in FIG. 4B are employed as the past values by an amount corresponding to response delay. While this updating is performed twice in FIG. 4B, the final value is the newer value at t3.

With the present embodiment, the backlash removal driving frequency thus updated is used for the backlash removal driving at the next time of driving. FIGS. 5A through 5D are drawings illustrating driving of the ultrasonic motor 3 multiple times. While driving is performed four times, each time following the first time uses the backlash removal driving frequency (DA output) obtained at the deceleration portion of the immediately-preceding driving for performing the backlash removal driving. Thus, while the backlash removal driving frequency (DA output) differs for each time, the motor rotation speed exhibits a backlash removal driving speed consistent with expectations. This action corresponds to repeating the proceeding from step S2 through step S9 in FIG. 3 four times.

Figure 6A:
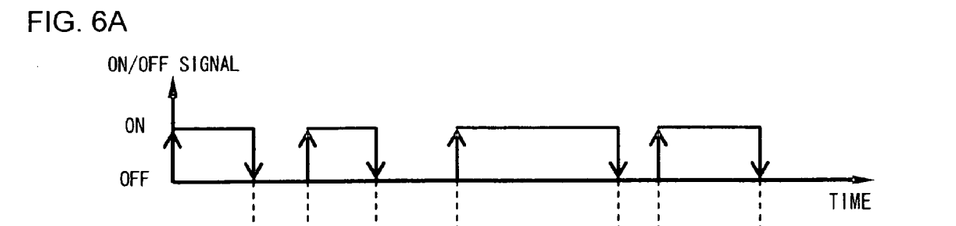
FIGS. 6A through 6D are graphs illustrating driving of the ultrasonic motor 3 in the event of not updating backlash removal driving frequency.
Figure 6B:
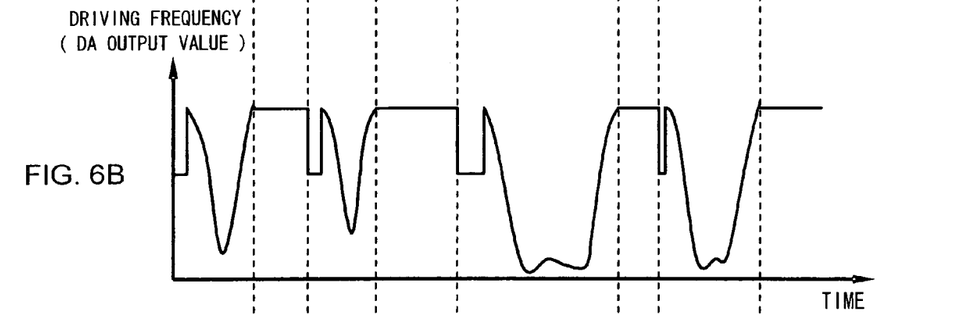
Figure 6C:
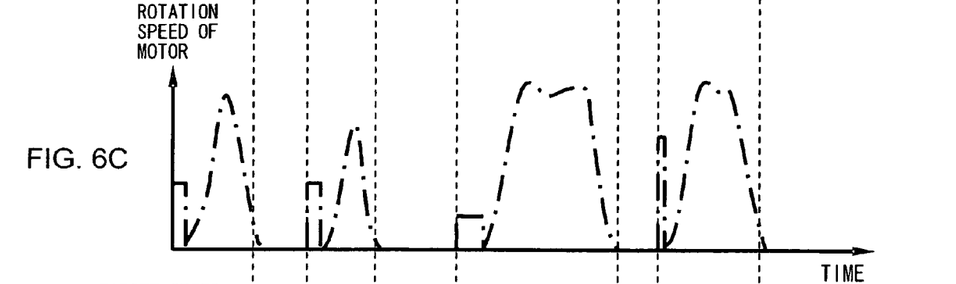
Figure 6D:
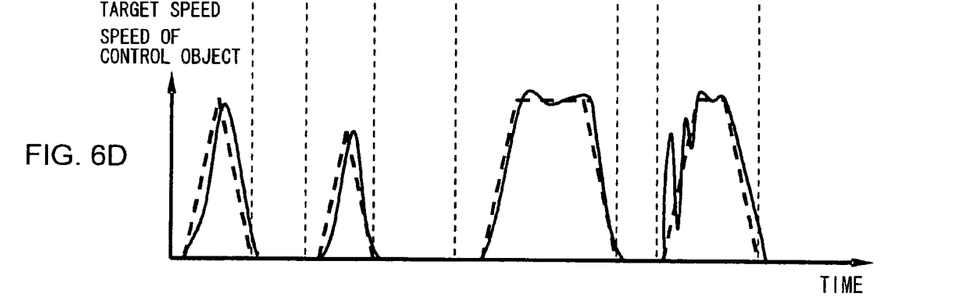

FIGS. 6A through 6D are graphs illustrating driving of the ultrasonic motor 3 in the event of not updating backlash removal driving frequency. The backlash removal driving frequency remains at the initial value and is not changed. Accordingly, the driving frequency at the backlash removal driving portions in FIG. 6B is exactly the same for all four driving times. Of these, the actual motor rotation speed at the third time are only half of the expected rotation speed (see FIG. 6C), so the backlash removal driving takes time. Also, with the fourth time, the actual motor rotation speed exceed the expected rotation speed (see FIG. 6C), so the control object is bumped away and the speed thereof is disturbed (see FIG. 6D). Note that in FIG. 6D, the solid lines show the actual speed of the control object 5, and the broken lines show the target speed.

The ultrasonic motor device according to the present embodiment that is configured as described above has the following advantages.

(1) Backlash removal driving signals and normal driving signals are different. Thus, backlash removal and normal driving of the control object 5 can each be suitably controlled.

(2) Normal driving signals are generated by feedback control, but the backlash removal driving signals are generated by open loop control. Consequently, normal driving is precisely driven by feedback control, Furthermore, at the time of backlash removal, there is no acceleration of the rotation speed of the ultrasonic motor 3, nor the ultrasonic motor 3 bumping the control object 5 away when the backlash has been taken up due to the rotation speed being too fast. That is to say, transmission error due to backlash is eliminated.

(3) The backlash removal driving signals are stopped following a predetermined amount of time elapsing after starting outputting the backlash removal driving signals for backlash removal. Subsequently, output of normal driving signals is started. This prevents a situation wherein backlash removal continues indefinitely due to some sort of problem occurring during backlash removal.

(4) The value of the driving signal (driving frequency, DA output value) at the time of the control object 5 reaching backlash removal driving speed at the previous time of normal driving is stored, and used as driving signals for the subsequent backlash removal driving. Accordingly, expected driving speed can be obtained with open loop control for backlash removal driving, and effects of backlash can be avoided. The correlation between frequency and rotation speed is not stable, due to various factors such as ambient temperature, load torque, rotational irregularities, and so forth. The present invention provides the above-described control. Thus, there are not problems such as higher-than-expected speeds bumping the control object away, or conversely insufficient speeds leading to longer driving time, or in worst-scenario cases, movement stopping completely, even if the environment of use of the ultrasonic motor changes.

(5) When storing the value of the driving signal (driving frequency, DA output value) at the time of the control object 5 reaching backlash removal driving speed at the previous time of normal driving, a driving signal which is earlier by an amount of time corresponding to the response delay is used, giving consideration to response delay. Accordingly, backlash removal can be performed according to more precise backlash removal driving signals.

(6) The ultrasonic motor device according to the present embodiment is used in a lens barrel of a camera. For example, in a case of interchangeable lenses using ultrasonic motors for a single-lens reflex camera, problems can be avoided such as inconsistent auto-focus drive time, vibration sensations due to actions felt when bumping the control object, poor focus precision or focus-hunting, and so forth.

While the above embodiment has been described with regard to an example of applying an ultrasonic motor device to a camera lens barrel, the present invention is not restricted to this application. The ultrasonic motor device can be applied to all usages in which ultrasonic motors are employed. Also, the ultrasonic motor may be a rotational ultrasonic motor or a linear ultrasonic motor. Furthermore, the term "ultrasonic motor" as used here also includes what are known as vibration actuators.

The above embodiment has been described with regard to an example of using an encoder 4 for detecting the movement and speed of the control object 5. However, the present invention is not restricted to this application. Any arrangement may be used as long as the movement and speed of the control object 5 can be detected.

The above embodiment has been described with regard to an example of removing backlash in a gear train. However, the present invention is not restricted to this application. For example, the connection mechanism from the ultrasonic motor 3 to the gear train, and the connection mechanism from the gear train to the control object 5 also have backlash. The aforementioned backlash removal driving allows the adverse effects of such backlash to be removed. That is to say, the present invention is applied to remove the adverse effects of backlash existing throughout the entire mechanism for transmitting the driving force of the ultrasonic motor 3 to the control object 5.

The above described embodiments are examples, and various modifications can be made without departing from the spirit and scope of the invention.

What is claimed is:

1. An ultrasonic motor device comprising:
an ultrasonic motor that moves an object;
a detecting unit that detects movement of the object; and
a control unit that outputs a first driving signal, which has a constant frequency to drive the ultrasonic motor at a speed level to prevent generation of backlash between the object and the ultrasonic motor, to the ultrasonic motor to start driving of the ultrasonic motor, continues to output the first driving signal before detection of the movement of the object, and outputs a second driving signal, which is different from the first driving signal, to the ultrasonic motor after the detection of the movement of the object,
wherein:
the control unit outputs the second driving signal with feedback control in which a signal with regard to the movement of the object detected by the detecting unit is used, and outputs the first driving signal without the feedback control.

2. The ultrasonic motor device according to claim 1, further comprising a transmission unit that transmits driving force of the ultrasonic motor to the object, wherein the control unit controls transmission error in the transmission unit by driving the ultrasonic motor according to the first driving signal.

3. The ultrasonic motor device according to claim 2, wherein the transmission unit includes a gear train.

4. The ultrasonic motor device according to claim 1, wherein the control unit sets the first driving signal and the second driving signal such that a driving speed of the ultrasonic motor driven according to the second driving signal is faster than a driving speed of the ultrasonic motor driven according to the first driving signal.

5. The ultrasonic motor device according to claim 1, wherein the control unit detects a movement speed of the object which is the same as a movement speed of the object driven according to the first driving signal, during at least one of a time of acceleration and a time of deceleration when the ultrasonic motor is driven according to the second driving signal.

6. The ultrasonic motor device according to claim 1, wherein the control unit drives the ultrasonic motor according to the second driving signal, following driving the ultrasonic motor according to the first driving signal for a predetermined amount of time.

7. The ultrasonic motor device according to claim 1, wherein the detecting unit comprises an encoder.

8. A lens barrel comprising:
a main lens barrel having an optical component; and
the ultrasonic motor device according to claim 1.

9. A camera capable of mounting the lens barrel according to claim 8.

10. The ultrasonic motor device according to claim 1, wherein the first driving signal is a driving signal to drive the ultrasonic motor at a speed level to prevent generation of backlash between the object and the ultrasonic motor.

11. A control method for controlling an ultrasonic motor device, comprising:
outputting a first driving signal, which has a constant frequency to drive an ultrasonic motor at a speed level to prevent generation of backlash between the ultrasonic motor and an object moved by driving of the ultrasonic motor, to the ultrasonic motor to start driving of the ultrasonic motor;

detecting of movement of the object;

outputting the first driving signal before detection of the movement of the object; and outputting a second driving signal which differs from the first driving signal, to the ultrasonic motor following the detection of the movement of the object, wherein:

the second driving signal is outputted with feedback control in which a signal with regard to the detected movement of the object is used, and outputs the first driving signal without the feedback control.

12. The control method according to claim 11, wherein, in an event that the ultrasonic motor is driven according to the first driving signal for a predetermined amount of time before the detection of the movement of the object, a control mode is switched to a mode in which the ultrasonic motor is driven according to the second driving signal.

13. The control method according to claim 11, wherein a movement speed of the object which is the same as a movement speed of the object driven according to the first driving signal is detected during at least one of a time of acceleration and a time of deceleration when the ultrasonic motor is driven according to the second driving signal.

14. The control method according to claim 11, wherein, in an event that the ultrasonic motor is driven according to the first driving signal for a predetermined amount of time before detection of the movement of the object, control mode is switched to a mode in which the ultrasonic motor is driven according to the second driving signal.

15. The control method according to claim 11, wherein a movement speed of the object which is the same as a movement speed of the object driven according to the first driving signal is detected during at least one of a time of acceleration and a time of deceleration when the ultrasonic motor is driven according to the second driving signal.

16. The control method according to claim 15, wherein the first driving signal is a driving signal to drive the ultrasonic motor at a speed level to prevent generation of backlash between the object and the ultrasonic motor.

\* \* \* \* \*